United States Patent [19]
Biranowski

[11] 3,956,200
[45] May 11, 1976

[54] FLAME RETARDANT BLENDS FOR FLEXIBLE POLYURETHANE FOAMS

[75] Inventor: Jerome Biranowski, New York, N.Y.

[73] Assignee: Stauffer Chemical Company, Westport, Conn.

[22] Filed: Oct. 8, 1970

[21] Appl. No.: 79,278

[52] U.S. Cl.................. 260/2.5 AR; 260/2.5 AJ
[51] Int. Cl.² .............. C08G 18/14; C08G 18/50; C08K 5/52
[58] Field of Search................... 260/2.5 AJ, 2.5 AR

[56] References Cited
UNITED STATES PATENTS

| | | | |
|---|---|---|---|
| 3,251,785 | 5/1966 | Anderson | 260/2.5 |
| 3,257,337 | 6/1966 | Schoepfle | 260/2.5 |
| 3,294,710 | 12/1966 | Rosenberg | 260/2.5 |
| 3,344,112 | 9/1967 | Birum | 260/2.5 X |
| 3,487,030 | 12/1969 | Praetzel | 260/2.5 |

FOREIGN PATENTS OR APPLICATIONS 729,334  9/1969  Belgium

*Primary Examiner*—C. Warren Ivy
*Attorney, Agent, or Firm*—William R. Robinson

[57] ABSTRACT

There are disclosed blends of a reactive flame retardant, comprising a polyglycol hydrogen polyphosphonate, and an additive, non-reactive flame retardant comprising a halogen and phosphorus containing reagent, which, when incorporated into the system during the preparation of flexible polyurethane foams, provides the resulting foams with an excellent balance of physical properties and flame retardancy.

3 Claims, No Drawings

FLAME RETARDANT BLENDS FOR FLEXIBLE POLYURETHANE FOAMS

BACKGROUND OF THE INVENTION

The production of polyurethane resins is a well known commercial process as described, for example, in the Kirk-Othmer, Encyclopedia of Chemical Technology, First Supplement, pages 888 et sec., (Interscience, 1957). Briefly, these polymers are prepared by means of the reaction between an isocyanate, such as toluene diisocyanate or diphenylmethane-4-4'diisocyanate, and a second reagent comprising a polyol which contains two or more hydroxyl groups. As used in this specification, the term "isocyanate material" is intended to include any polyisocyanate or urethane compounds containing two or more unreacted-NCO radicals.

The most common polyurethanes are formed by reaction of toluene diisocyanate and a polyol or polyester. Representative polyesters are the reaction products of adipic acid and/or phthalic anhydride and ethylene glycol. Other polyols which may be used in place of the polyesters are polyethers, such as the polyoxypropylenediols and polyoxypropylene triols, caster oil and drying oils, etc.

Polyurethane foams, or urethane foams as they are frequently referred to, differ from other cellular plastics groups in that the chemical reactions causing foaming occur simultaneously with the polymer-forming reactions. As in the case of polyurethane resins, the polymeric constituent of urethane foams is made by reacting a polyol with an isocyanate. When the isocyanate is in excess of the amount that will react with the polyol, and when water is present, the excess isocyanate will react with water to produce carbon dioxide which expands the mixture. Urethane foams may be flexible or rigid and may have open or closed cells, depending largely on the polyol used. Crosslinked foams are rigid or semi-rigid. Auxiliary blowing or foaming agents, such as the various halohydrocarbons, are sometimes used especially in rigid foams. Other ingredients often incorporated in urethane foams are catalysts to control the speed of reaction, and a surfactant to stabilize the rising foam and control cell size.

Three basic processes are used for making urethane foams: The prepolymer technique, the semi-prepolymer technique and the one-shot process. In the prepolymer technique, a polyol and an isocyanate are reacted to produce a compound which may be stored and subsequently mixed with water, catalyst and, in some cases, a foam stabilizer. In the semi-prepolymer process, about 20% of the polyol is prereacted with all of the isocyanate, then this product is later reacted with a masterbatch containing the remainder of the ingredients. And, in the one-shot process, an isocyanate, a polyol and catalyst are fed into separate streams to a mixing head from which the mixed reactants are discharged into a mold.

Regardless of the procedure utilized for their preparation, polyurethane foams are enjoying ever increasing utilization in a wide variety of applications including their use in household appliances, airplane construction, padding for mattresses and upholstery, interlinings for overcoats and sleeping bags, soundproof walls, insulation against heat loss, life preservers, fish net floats, foam rubber specialties, air filters, packaging and bone surgery.

In many of the above listed applications for polyurethane foams, they are utilized under conditions where they may be exposed to fire or to prolonged high temperatures. Accordingly, it may be necessary or desirable that the foam have flame retardant properties so that burning will be eliminated or minimized as by having the burning rate reduced in the event that it should catch fire. Various materials have been incorporated into polyurethane foams in order to provide them with such flame retardant properties. These additives may be divided into two broad classes. The first of these comprise simple, extraneous additives which do not react with any of the components of the foam. Exemplary of such extraneous additives are the halogenated hydrocarbons and halogen substituted, phosphates or polyphosphonates.

The second broad class of flame retardant additives for polyurethane foams comprise the so-called functional additives which have reactive or functional groups capable of reacting with the polyol or isocyanate reagents used in preparing the foams. Accordingly, when admixed with the foam forming ingredients, such compounds become chemically incorporated as an integral component of the resulting foam. Since it is an integral part of the foam, it cannot be readily removed therefrom as by solvent leaching or other means such as may be prone to affect the loss of those extraneously added materials which are merely physically blended with the foam.

One such group of functional or reactive flame retardant additives are the polyglycol hydrogen polyphosphonates of the formula:

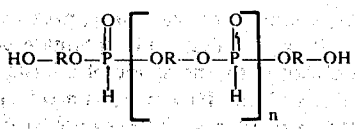

wherein R is a polyoxyalkylene ether radical and n is an integer having a value of from 1 to 5. These compounds are described and an improved method for their preparation is claimed in application Ser. No. 709,952, filed Mar. 4, 1968, and now abandoned, the entire disclosure of which is here incorporated by reference.

Although these polyglycol hydrogen polyphosphonates have provided excellent results as reactive flame retardant additives for polyurethane foams, there have been some problems associated with their use. Thus, for example, when introduced in a high concentration of from about 10 to 30%, by weight, in order to yield foams displaying a particularly high degree of flame retardancy, it has been found that some of the physical properties of the resulting foams, such as their density and resiliency, are somewhat deficient as compared with those of comparable foams which do not contain these reactive additives.

Thus, it is the prime object of this invention to provide a means for employing high concentrations of polyglycol hydrogen polyphosphonates as flame retardant additives for flexible polyurethane foams without adversely affecting the physical properties of the resulting foams. A further object involves the preparation of flexible polyurethane foams characterized by their unusual combination of outstanding flame retardancy along with their excellent physical properties. Various other objects and advantages of this invention will be apparent from a reading of the disclosure which follows hereinafter.

TECHNICAL DISCLOSURE OF THE INVENTION

It has now been found that by introducing, into the reaction system, a blend of two flame retardants, comprising one or more polyglycol hydrogen polyphosphonates which functions as a reactive flame retardant, along with one or more additive or non-reactive flame retardants comprising a halogen and phosphorus containing reagent, as hereinafter defined, prior to the completion of the reaction between one or more polyisocyanates and one or more polyols, it is possible to obtain polyurethane foams which, while retaining or actually improving upon their physical properties, also display an outstanding degree of flame retardancy. Moreover, the retention, by these foams, of their physical properties is accomplished even though the reactive polyphosphonate is used in a high concentration which would, in the absence of the halogen and phosphorus containing reagent, have an adverse effect upon some of the physical properties of the resulting foam.

As previously noted, the polyglycol hydrogen polyphosphonates utilized in the process of this invention correspond to the formula:

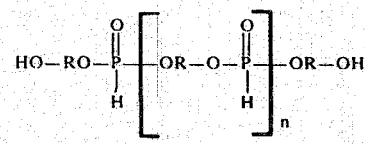

wherein R is a polyoxyalkylene ether radical and n is an integer having a value of from 1 to 5.

These polyphosphonates are, generally, prepared by transesterifying a dialkyl or diaryl phosphonate with a polyoxyalkylene glycol in the presence of a basic catalyst such as metallic sodium. However, as produced by means of the latter procedures, the resulting products are high in acid content as indicated by acid numbers ranging from about 100 to 300 as determined in isopropanol with potassium hydroxide. This high degree of acidity can be extremely detrimental to the tertiary/amine catalysts which are often used in preparing polyurethane foams since it affects their neutralization and thereby destroys their catalytic activity.

Accordingly, it is preferred, in the process of this invention, to employ polyglycol hydrogen polyphosphonates which have been prepared by means of the procedure described in copending application Ser. No. 709,952 since the resulting products have acid numbers of less than about 10 mg of KOH per gram and do not, therefore, significantly interfere with the catalytic activity of the basic tertiary amine catalysts used in the formation of polyurethane foams. This new preparative procedure involves transesterifying a polyoxyalkyleneglycol with a dialkyl or diaryl phosphonate, i.e. a diester phosphonate, in the presence of a strongly basic catalyst, in a solvent system which allows for the removal of the by-product alkanol or phenol.

The diester phosphonates applicable for use in this process are compounds of the formula:

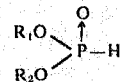

wherein $R_1$ can be an alkyl or aryl group and $R_2$ can be an alkyl or aryl group independent of $R_1$. Illustrative of the alkyl groups $R_1$ and $R_2$ are methyl, ethyl, propyl and butyl groups, as well as substituted alkyl groups wherein the substituent groups may be halo or aromatic groups, etc. Typical aryl groups are illustrated by phenyl and naphthyl groups and the substituted forms thereof.

Representative of these diester phosphonates are: dimethyl phosphonate, diethyl phosphonate, diisopropyl phosphonate, dibutyl phosphonate, dihexyl phosphonate, dioctyl phosphonate, dibenzyl phosphonate, and the like; and, mixed alkyl phosphonates such as ethyl methyl phosphonate, methyl benzyl phosphonates, diphenyl phosphonate and the like.

The polyoxyalkylene glycols suitable for use in the above described process for preparing low acidity polyphosphonates are compounds of the formula:

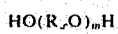

$$HO(R_xO)_mH$$

wherein $R_x$ is a straight or branched alkylene radical containing from 2 to about 8 carbon atoms, and $m$ is an integer of from 2 to 100 inclusive. Preferably, these polyoxyalkylene glycols should have a low molecular weight, e.g. where $m$ has a value of from about 2 to 20 and, preferably, from about 2 to 20, and $R_x$ is a straight or branched carbon chain of from 2 to 4 carbon atoms between two oxygen atoms.

Illustrative of these polyoxyalkylene glycols are: diethylene glycol, triethylene glycol, dipropylene glycol, tripropylene glycol polyethylene glycol where the average number of ether units is 2, polypropylene glycol where the average number of ether units is 14, dibutylene glycol, tributylene glycol, trihexylene glycol, and the like.

The solvents which can be utilized in this preferred process for preparing these low acidity polyphosphonates are organic solvents which should be miscible but non-reactive with the reactants as well as with the finally formed transesterification reaction product. They can be solvents, such as benzene, which can form an azeotrope with the by-product alcohol or phenol of the transesterification reaction. Or, the solvent can be one which does not form an azeotrope with the by-product alcohol or phenol. Such non-azeotropic solvents include: xylene, ethyl benzene, diethyl benzene, and the various alkanes which have a higher boiling point than the ethyl alcohol liberated during the transesterification reaction. However, the use of a non-azeotropic type solvent, and especially xylene, is preferred over the use of an azeotropic type solvent since the process can be conducted at a higher temperature so as to decrease the overall reaction time.

The concentration of solvent necessary to provide the aforedescribed results is ordinarily the amount needed to dilute the reaction mixture and allow the by-product alcohol or phenol to be distilled off. The use of excess solvent is unnecessary and decreases the reaction rate.

The presence of the solvent in this preferred process for preparing polyphosphonates minimizes the formation of acid residues in the final product and assists in the removal of the by-product alcohol or phenol from the transesterification reaction mixture. The use of a solvent also allows the transesterification reaction to be conducted with mole ratios of dialkyl phosphonate to polyoxyalkylene glycol ranging from 1:0.7 to 1:2.0 while still providing products exhibiting good flame retardancy characteristics and low acid values. This improved process can also be conducted using a mole ratio of dialkyl phosphonate to polyoxyalkylene glycol of approximately 1:1. Preferably, the mole ratio of dialkyl phosphonate to polyoxyalkylene glycol is maintained within the range of approximately 1:1 to approximately 1:1.3 in order to insure completion of the transesterification reaction.

As has been noted, this transesterification process is conducted in the presence of a strongly basic catalyst. Illustrative of preferred catalytic materials are sodium methoxide, sodium alkoxides, sodamide, sodium and sodium hydroxide. Other strongly basic materials such as magnesium oxide, the alkaline earth or alkali metals, potassium hydroxide, calcium oxide, sodium aluminate and the like can also be utilized as catalysts.

The transesterification reaction is favored by elevated temperatures, e.g., any temperature between the range of the boiling point of the by-product alcohol or phenol and the thermal decomposition temperature of the resultant product. The reaction is generally conducted under standard atmospheric pressure conditions, although sub-atmospheric pressure conditions can be utilized to facilitate removal of the by-product alcohol or phenol. This is particularly important if the by-product alcohol or phenol and/or solvent has a boiling point close to the thermal decomposition temperature of the transesterification reaction product. Super-atmospheric pressures can also be utilized where low boiling polyphosphonates are being prepared so as to increase the rate of the transesterification reaction. Additional details relating to the preparation of the polyphosphonates by means of this improved process may be obtained by referring to the above identified copending patent application.

Preferred for use as the polyglycol hydrogen polyphosphonates in the flameproofing blends of this invention is the product resulting from the reaction between tripropylene glycol and diethyl phosphonate.

The halogen and phosphorus containing reagents which may be utilized as the additive or non-reactive component of the flameproofing blends of this invention may be characterized as essentially neutral, low volatility compounds devoid of any functional groups which are reactive towards isocyanate groups and which contain from about 4–25%, by weight, of phosphorus and from about 15–70%, by weight, of a halogen selected from the group consisting of chlorine and bromine and mixtures thereof.

Exemplary of such compounds are tris(2-chloroethyl) phosphate, tris(dichloropropyl) phosphate, tris(dibromopropyl) phosphate, tris(2-chloropropyl) phosphate, tris(bromochloropropyl) phosphate and the chlorinated polyphosphonates or mixtures of chlorinated polyphosphonates having the formula:

where $n$ is an integer having a value of from about 0 to 3. Mixtures of any two or more of these various types of non-reactive additives may also be used if so desired. Optimum results are obtained by the use of tris(dichloropropyl) phosphate. The above described non-reactive reagents are all commercially available products or they may be readily synthesized by organic chemists skilled in the art.

With respect to proportions, the ratio of the reactive polyphosphonate to non-reactive halogen and phosphorus containing reagent in these novel flame retarding blends for flexible polyurethane foams is, on a weight basis, from about 20:1 to 1:1 with a ratio of from about 5:1 to 1:1 being preferred. The concentration of the flame retarding blend in the final polyurethane foam should be in the range of from about 3 to 30%, by weight, with a concentration of from about 5 to 20%, by weight, being preferred. The specific proportions of each component of these blends as well as the overall concentration of the blend in the polyurethane foam will, of course be dependent upon such factors as the degree of flame retardancy desired in the foam and the particular end use application in which the foam is to be utilized.

The actual incorporation of these novel flame retarding blends in the preparation of flexible polyurethane foams may be accomplished by means of a variety of procedures including the preliminary admixture of the blend, or its individual components, with the polyol reagent prior to the polymerization reaction or the blend, or the two individual components of the blend may be introduced as separate streams to a foam machine mixing head.

As examples of organic polyisocyanates which can be employed to make the polyurethane foams there can be employed one or more of such compounds as: toluene-2,4-diisocyanate; toluene-2,6-diisocyanate; 4-methoxy-1,3-phenylene diisocyanate; diphenyl methane-4,4'-diisocyanate; 4-chloro-1,3-phenylene-diisocyanate; 4-isopropyl-1,3-phenylene-diisocyanate; 4-ethoxy-1,3-phenylene-diisocyanate; 2,4-diisocyanate-diphenyl ether; 3,3'-dimethyl-4,4'-diisocyanatodiphenyl methane; mesitylene diisocyanate; durylene diisocyanate; 4,4'-methylene-bis(phenylisocyanate); benzidine diisocyanate; o-nitrobenzidine diisocyanate; 4,4'-diisocyanatodibenzyl; 3,3'-bitolylene-4,4'-diisocyanate; 1,5-naphthalene diisocyanate; tetramethylene diisocyanate; hexamethylene diisocyanate; decamethylene diisocyanate; toluene-2,4,6-triisocyanate; tritolylmethane triisocyanate; 2,4,4'-triisocyanatodiphenyl ether; the reaction product of toluene diisocyanate with trimethylolpropane; and, the reaction product of toluene diisocyanate with 1,2,6-hexanetriol.

Alternatively, as the polyisocyanate there can be used prepolymers made by reacting one or more of the above polyisocyanates with a polyhydroxy compound such as a polyester having terminal hydroxyl groups, a polyhydric alcohol, glycerides or hydroxy containing glycerides, etc. The prepolymers should have terminal isocyanate groups. To insure their presence it is fre-

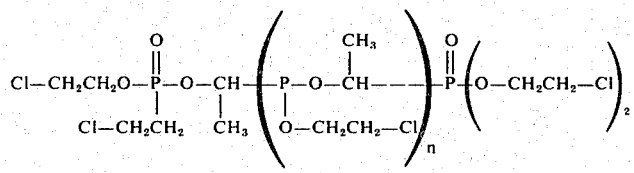

quently desirable to employ an excess of 5% or more of the polyisocyanate in forming the prepolymer. Typical examples of such prepolymers having isocyanate end groups are those formed from toluene diisocyanate and polyhydroxy compounds. In most cases, a mixture of 80% of the 2,4-isomer and 20% of the 2,6-isomer of toluene diisocyanate is employed in making these prepolymers. Thus, there can be used the prepolymers resulting from the reaction between toluene diisocyanate and castor oil, blown tung oil, blown linseed oil or blown soya oil, and of toluene diisocyanate and the polyester of ethylene glycol, propylene glycol and adipic acid.

Examples of suitable polyols are polyethylene glycols, polypropylene glycols; ethylene glycol; diethylene glycol; triethylene glycol; propylene glycol; dipropylene glycol; tripropylene glycol; 1,4-butanediol; thiodiglycol; glycerol; trimethylolethane; trimethylolpropane; ether triols from glycerine and propylene oxide; ether containing triols from 1,2,6-hexanetriol and propylene oxide; sorbitol-propylene oxide adducts; pentaerythritol-propylene oxide adducts; trimethylol phenol; oxypropylated sucrose; triethanolamine; pentaerythritol; diethanolamine, castor oil; blown linseed oil; blown soya oil; N,N,N',N'-tetrakis (2-hydroxyethyl) ethylenediamine; N,N,N',N'-tetrakis (2-hydroxypropyl) ethylenediamine; mixed ethylene glycol-propylene glycol adipate resin; polyethylene adipate phthalate and polyneopentylene sebacate.

In preparing the foamed polyurethanes, there can be used any of the conventional basic catalysts such, for example, as N-methyl morpholine, N-ethyl morpholine, 1,2,4-trimethylpiperazine, trimethyl amine, triethyl amine, tributyl amine and other trialkyl amines, the esterification product of adipic acid and diethylethanolamine, triethyl amine citrate, 3-morpholinopropionamide, 1,4-bis(2-hydroxypropyl)-2-methylpiperazine, 2-diethylaminoacetamide, 3-diethylaminopropionamide, diethylethanolamine, triethylenediamine, N,N,N',N'-tetrakis (2-hydroxypropyl) ethylenediamine N,N'-dimethylpiperazine, N,N-dimethylhexahydroaniline, tribenzylamine and sodium phenolate. Also applicable are tin compounds, e.g. hydrocarbon tin acylates such as dibutyltin dilaurate, dibutyltin diacetate, dibutyltin dioctoate, tributyltin monolaurate, dimethyltin diacetate, dioctyltin diacetate, dilauryltin diacetate, dibutyltin maleate and alkyltin alkoxides, e.g., dibutyltin diethoxide, dibutyltin dimethoxide, diethyltin dibutoxide as well as other tin compounds, e.g., octylstannoic acid, trimethyltin hydroxide, trimethyltin chloride, triphenyltin hydride, triallyltin chloride, tributyltin fluoride, dibutyltin dibromide, bis(carboethoxymethyl) tin diiodide, tributyltin chloride, trioctyltin acetate, butyltin trichloride or, octyltin tris(thiobutoxide), dimethyltin oxide, dibutyltin oxide, dioctyltin oxide, diphenyltin oxide, stannous octoate, and stannous oleate.

Conventional surfactants can be added in the amount of 1% or less, e.g., 0.2% by weight of the composition. The preferred surfactants are silicones, e.g., polydimethyl siloxane having a viscosity of 3 to 100 centistokes, triethoxydimethyl polysiloxane, molecular weight 850 copolymerized with a dimethoxypolyethylene glycol having a molecular weight of 750.

The foaming reaction can be carried out by adding water to the polyol prior to or simultaneously with the addition of the polyisocyanate. Alternatively, foams can be prepared by the use of a foaming or blowing agent. These are usually a liquefied, halogen substituted alkane such, for example, as methylene chloride. Especially preferred are those halogen substituted alkanes having at least one fluorine atom in their molecules such as dichlorodifluoromethane, dichloromonofluoromethane, chlorodifluoromethane, and dichlorotetrafluoroethane. In using these blowing agents they are uniformly distributed in either the polyol reactant or the polyisocyanate reactant whereupon the reactants are mixed permitting the temperature of the mixture to rise during the ensuing reaction above the boiling point of the liquefied gas so as to produce a porous polyurethane. It should also be noted that foaming may also be affected by combining the use of a blowing agent with the addition of water to the polyol.

The flame retardant polyurethane foams resulting from the process of this invention may be utilized in all of the above noted end use applications for such foams and particularly those applications wherein their flame retardant properties render them particularly useful such, for example, as insulation materials for building construction.

The following examples will further illustrate the embodiment of this invention. In these examples, all parts given are by weight unless otherwise noted.

EXAMPLE I

This example illustrates the preparation of a low acidity, polyglycol hydrogen polyphosphonate especially suitable for use in the flame retardant blends of the subject invention.

A total of 192 grams (1.0 mole) of tripropylene glycol and 138 grams (1.0 mole) of diethyl phosphonate are mixed with 500 milliliters of benzene with a small piece of sodium being added as a catalyst. The reaction mixture is heated to reflux in a reaction vessel having a glass helicie packed column attached thereto. The temperature in the reaction vessel is 95°C. while in the column it is 68°C. Thereafter, 327 grams of distillate having a boiling point of 68° – 72°C. are collected. The distillate analyzed as 77% benzene and 23% ethanol and is equivalent to 72 grams of alcohol as against a theoretical 91 grams, thereby indicating a 78% conversion. Analysis of the product showed an acid number of 2.0, a phosphorus content of 12.4%, and a hydroxyl number of 170.

EXAMPLE II

This example illustrates the preparation of another low acidity, polyglycol hydrogen polyphosphonate especially suitable for use in the flame retardant blends of the subject invention.

A total of 192 grams (1.0 mole) of tripropylene glycol and 138 grams (1.0 mole) of diethyl phosphonate are mixed with 250 milliliters of xylene with a pinch of powdered sodium methoxide being added as a catalyst. The reaction mixture is heated to reflux in a reaction vessel having a glass helicie packed column attached thereto. Thereafter, during a 6–7 hour reflux period, 91.2 grams of ethyl alcohol distillate is collected equivalent to a 89.5 % conversion of diethyl phosphonate. The product is stripped of solvent by heating at 100°C/10 mm. Hg. and filtered through a bed of fuller's earth yielding 238 grams of a semi-viscous oil. Analysis showed an acid number of $3.6_9 n_D^{25}= 1.4593$, a phosphorus content of 12.3%, and a hydroxyl number of 58.

EXAMPLE III

This example illustrates the preparation of a polyurethane foam incorporating the novel, two-component flame retardant blend of this invention. It also provides a comparison with foams which contain each of the individual components of these blends as well as a control formulation which did not contain either of the two components.

A number of different polyurethane foams are prepared by admixing their respective ingredients in the sequence in which they are listed in the following table and pouring the resultant mixture into an 8 inch square box.

1. Rise Time — The time required for the foam to rise. A rise time of from about 0.5 to 2.0 minutes is acceptable.
2. Density — A density of from about 1.2 – 2.0 pounds per cubic foot is acceptable.
3. Air Flow — This is an evaluation of the porosity of the foam in terms of the air flow, in cubic feet per minute, required to maintain a constant pressure differential across the one inch dimension of a 2 inch × 2 inch × 1 inch specimen of the foam which is placed in an apparatus which maintains a vacuum of 0.5 inches of $H_2O$ across the rear surface of the cube. An air flow value greater than 2 cubic feet per minute is considered satisfactory.

PARTS

| | FOAM No.1 | FOAM No.2 | FOAM No.3 | FOAM No.4 | FOAM No.5 | FOAM No.6 | FOAM No.7 | FOAM No.8 | FOAM No.9 | FOAM No.10 | FOAM No.11 | CONTROL |
|---|---|---|---|---|---|---|---|---|---|---|---|---|
| The polyglycol hydrogen phosphonate whose preparation is described in Example I | 30 | — | 30 | — | 30 | — | 30 | — | 30 | — | 30 | — |
| Tris(dichloropropyl) phosphate | — | 30 | 20 | — | — | — | — | — | — | — | — | — |
| Tris(2-chloroethyl) phosphate | — | — | — | 30 | 20 | — | — | — | — | — | — | — |
| Tris(2-chloropropyl) phosphate | — | — | — | — | — | 30 | 20 | — | — | — | — | — |
| Mixture of Chlorinated polyphosphonates[1] | — | — | — | — | — | — | — | 30 | 20 | — | — | — |
| Tris(2,3-dibromopropyl) phosphate | — | — | — | — | — | — | — | — | — | 30 | 20 | — |
| THANOL F-3002[2] | 200 | 200 | 200 | 200 | 200 | 200 | 200 | 200 | 200 | 200 | 200 | 200 |
| A silicone surfactant sold by the Union Carbide Corp. as "L-540" | 3.0 | 3.0 | 3.0 | 3.0 | 3.0 | 3.0 | 3.0 | 3.0 | 3.0 | 3.0 | 3.0 | 3.0 |
| Water | 7.8 | 7.8 | 7.8 | 7.8 | 7.8 | 7.8 | 7.8 | 7.8 | 7.8 | 7.8 | 7.8 | 7.8 |
| Dimethyl ethanolamine (Catalyst) | 0.6 | 0.6 | 0.6 | 0.6 | 0.6 | 0.6 | 0.6 | 0.6 | 0.6 | 0.6 | 0.6 | 0.6 |
| Trimethylaminoethylpiperazine (Catalyst) | 0.2 | 0.2 | 0.2 | 0.2 | 0.2 | 0.2 | 0.2 | 0.2 | 0.2 | 0.2 | 0.2 | 0.2 |
| Dimethylformamide (Cell Opener) | 6.0 | — | 6.0 | 6.0 | 6.0 | 6.0 | 0.6 | 6.0 | 6.0 | — | — | 6.0 |
| A hydrocarbon oil sold by the Sun Oil Co. as "SUNPAR 106H" (Cell Opener) | — | 5.0 | — | — | — | — | — | — | — | 5.0 | — | — |
| Methylene Chloride (Blowing Agent) | 6.0 | 6.0 | 6.0 | 6.0 | 6.0 | 6.0 | 6.0 | 6.0 | 6.0 | 6.0 | 6.0 | 6.0 |
| A 50% solution of stabilized stannous octoate in dioctyl phthalate (Catalyst) | 1.0 | 1.4 | 1.0 | 1.0 | 1.0 | 1.0 | 1.0 | 1.0 | 1.0 | 1.1 | 1.1 | 1.0 |
| An 80:20 mixture of 2,4- and 2,6-toluene diisocyanate(TDI) | 105.1 | 100.2 | — | 100.2 | — | 100.2 | — | 100.2 | — | 100.2 | — | 100.2 |
| A 65:35 mixture of 2,4- and 2,6-toluene diisocyanate(TDI) | — | — | 105.1 | — | 105.1 | — | 105.1 | — | 105.1 | — | 105.1 | — |

[1] A mixture of chlorinated polyphosphonates having the formula:

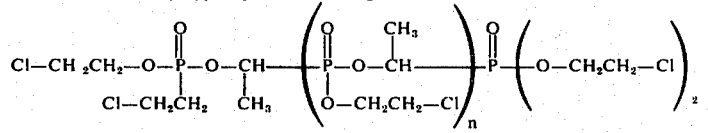

where n is an integer having a value of from about 0 to 3.

[2] A polyol comprising a propylene oxide adduct of glycerine having some ethylene oxide capping and a molecular weight of about 3,000 sold by the Jefferson Chemical Co.

In carrying out this procedure, all of the ingredients, with the exception of the TDI are thoroughly admixed with one another, whereupon the TDI is introduced thereby initiating the foam forming reaction. In each case, the TDI index of the resulting foams is 108, the latter factor being computed as follows:

$$\text{TDI Index} = \frac{\text{Equivalents of —NCO Groups}}{\text{Total equivalents of —OH Groups in the polyol, the flame retardants and water}} \times 100$$

The following table presents the flame retardancy and physical property data for each of the foams which are prepared. The physical properties which are evaluated are:

4. 90% Compression Set - In this test, a 2 inch × 2 inch × 1 inch cube of the foam is compressed, in the 1 inch dimension, down to a thickness of 0.1 inch and held in this position for 22 hours at 72°F. Upon releasing the pressure, the amount of set, i.e. the extent to which the foam has been compressed, is measured. Thus, if the foam returns to its original 1 inch width, it has a zero set. Accordingly, low values, no higher than about 20%, are desirable in this test as being indicative of a high degree of resiliency.

The flame retardancy characteristics of the various foams are determined by means of the following procedures:

1. ASTM Test D-1692 - This test evaluates the surface flammability of the foams by supporting a 6 inch × 2 inch × 0.5 inch foam specimen on a horizontal hardware-cloth with the 0.5 inch dimension vertical and contacting one end for 60 seconds with a 1.5 inch high blue flame from a ⅜ inch diameter barrel bunsen burner fitted with a 1⅞ inch wide wing top. During the course of this test, the burning rate inches per minute is measured and it is also noted whether the sample is self-extinguishing or whether it continues to burn until it is completely extinguished.

2. Dry Heat Aging Test - This test is identical to ASTM test D-1692 with the exception that the foam samples are first dry heat aged at 140°C. for 22 hours prior to being burned. Thus, it is a far more rigorous test since the foam is in a drier, more flammable condition before being burned and many foams lose their additive flame regardants by volatilization.

| | FOAM No.1 | FOAM No.2 | FOAM No.3 | FOAM No.4 | FOAM No.5 | FOAM No.6 | FOAM No.7 | FOAM No.8 | FOAM No.9 | FOAM No.10 | FOAM No.11 | Control |
|---|---|---|---|---|---|---|---|---|---|---|---|---|
| Rise Time (Seconds) | 83 | 89 | 103 | 96 | 106 | 104 | 105 | 110 | 115 | 110 | 103 | 90 |
| Density (lbs/cu.ft) | 1.52 | 1.76 | 1.93 | 1.85 | 1.96 | 1.90 | 1.88 | 9.95 | 1.86 | 1.82 | 2.02 | 1.70 |
| Airflow (Cu.ft/min) | 1.2 | 4.8 | 3.0 | 3.6 | 3.5 | 3.2 | 4.1 | 3.5 | 2.7 | 2.9 | 2.96 | 2.8 |
| 90% compression set | 21 | 11 | 19 | 14 | 12 | 11 | 21 | 13 | 90 | 13 | 16 | 10 |
| ASTM Test D-1692 | SE[1] | SE | SE | SE | SE | SE | SE | SE | SE | SE | SE | Burns |
| Burning Rate (in/min) | 2.3 | 4.2 | 1.6 | 3.8 | 3.0 | 4.1 | 2.8 | 2.9 | 2.9 | 2.2 | 1.3 | 5.5 |
| Dry Heat Aging Test | SE[1] | Burns[2] | SE | Burns | Burns | Burns | SE | Burns | SE | Burns | SE | Burns |
| Burning Rate (in/min) | 3.7 | 6.0 | 2.1 | 5.0 | 4.1 | 5.5 | 4.0 | 6.0 | 3.9 | 4.1 | 1.8 | 6.1 |

[1]SE = Self-extinguishing
[2]Burns = The entire sample is eventually consumed

The results set forth in the above table, and particularly the burning data obtained in the dry heat aging test, are clearly indicative of the superior flame proofing for polyurethane foams that is provided with the novel, two-component blends of this invention.

Variations may be made in proportions, procedures and materials without departing from the scope of this invention as defined in the following claims.

What is claimed is:

1. A flame retardant polyurethane foam containing moieties of a blend of (1) a polyglycol hydrogen polyphosphonate having an acid number of less than about 10 mg. of KOH per gram of said polyphosphonate corresponding to the formula:

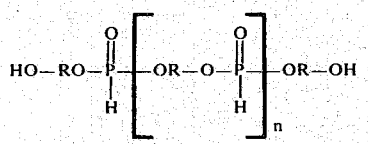

wherein R is an ether radical of tripropylene glycol and n is an integer having a value of from 1 to 5; and (2) a non-reactive halogen and phosphorus containing reagent selected from the group consisting of tris(dichloropropyl) phosphate and tris(2,3-dibromopropyl) phosphate wherein the ratio of said polyphosphonate to said non-reactive reagent is from 5:1 to 1:1 and wherein the total concentration of said blend in said foam is from about 5 to 25%, by weight.

2. The foam of claim 1 wherein said non-reactive halogen and phosphorus containing reagent is tris(dichloropropyl) phosphate.

3. The foam of claim 1 wherein said non-reactive halogen and phosphorus containing reagent is tris(2,3-dibromopropyl) phosphate.

* * * * *